(12) United States Patent
Jonsson et al.

(10) Patent No.: US 6,924,613 B2
(45) Date of Patent: Aug. 2, 2005

(54) SYSTEM AND METHOD FOR MONITORING CURRENT AND PROVIDING MOTOR PROTECTION

(75) Inventors: Gregg Jonsson, Batavia, IL (US); Scott Mayhew, North Aurora, IL (US); Scott Wakefield, Plano, IL (US); Daniel Zuzuly, Geneva, IL (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 20 days.

(21) Appl. No.: 10/252,618

(22) Filed: Sep. 23, 2002

(65) Prior Publication Data
US 2004/0056615 A1 Mar. 25, 2004

(51) Int. Cl.[7] ................................................. H02P 7/00
(52) U.S. Cl. .................. 318/432; 318/433; 318/434; 318/783; 361/93.1; 361/23; 361/25; 361/30
(58) Field of Search ................................ 318/430, 432, 318/433, 434, 783, 787; 361/23–25, 30, 42, 93.1, 93.5, 93.6, 93.9

(56) References Cited

U.S. PATENT DOCUMENTS

| | | | | |
|---|---|---|---|---|
| 5,034,874 A | * | 7/1991 | Araki | 363/41 |
| 5,309,075 A | * | 5/1994 | Yokoe et al. | 318/608 |
| 5,546,262 A | * | 8/1996 | Baurand et al. | 361/31 |
| 5,592,355 A | * | 1/1997 | Ikkai et al. | 361/94 |
| 6,204,751 B1 | * | 3/2001 | Bolda et al. | 340/286.02 |
| 6,583,975 B2 | * | 6/2003 | Bax | 361/93.1 |

* cited by examiner

Primary Examiner—Rina Duda

(57) ABSTRACT

A motor controller system comprises solid state switches for connection between an AC line and motor terminals for controlling application of AC power to the motor. A user input elements selects a current imbalance parameter. Current sensors sense current in each winding of the motor. A control circuit controls operation of the solid state switches. The control circuit compares the sensed currents with the selected imbalance parameter to determine if a fault condition exists.

12 Claims, 5 Drawing Sheets

SYSTEM AND METHOD FOR MONITORING CURRENT AND PROVIDING MOTOR PROTECTION

CROSS REFERENCE TO RELATED PATENT APPLICATIONS

The present U.S. patent application having at least one common inventor as

U.S. patent application Ser. No. 10/252,326 entitled "System and Method for Configuring a Starter with an External Device", and U.S. patent application Ser. No. 10/252,635 entitled "System and Method for Individual Phase Motor Over Voltage Protection", and U.S. patent application Ser. No. 10/252,637 entitled "System and Method for Automatic Current Limit Control", and U.S. patent application Ser. No. 10/252,327 entitled "System and Method for a Configurable Motor Controller", are filed with the U.S. Patent and Trademark Office concurrently on Sep. 23, 2002, the entirety of each being incorporated herein by reference.

FIELD OF THE INVENTION

This invention relates to a motor controller and more particularly, a system and method for monitoring current and providing motor protection.

BACKGROUND OF THE INVENTION

Solid state starters/controllers have found widespread use for controlling application of power to an AC induction motor. The conventional starter/controller, referred to hereinafter as simply a starter or a controller, uses solid state switches for controlling application of AC line voltage to the motor. The switches may be thyristors such as silicon controlled rectifiers (SCRs) or triacs.

One application for a motor controller is as an elevator starter. The elevator starter may be used to drive a pump for an hydraulic elevator. Each time movement of an elevator car is commanded, then the starter must start the motor until it reaches operating speed and then operate in a run mode. Such a starter may only be used for the up direction as gravity may be used for the down direction.

A conventional motor controller system may use current transformers for sensing current of each motor winding. A standard overload system determines if sensed current exceeds a preselect threshold amount for a specified amount of time and if so either halts motor operation or decreases current supplied to the windings by varying control of the solid state switches. Elevator systems typically use a delta motor. The controller switches are wired inside the delta. Delta motors may be imbalanced. Conventional control systems use average current through the windings to determine overload conditions. However, this could result in damage to a single winding if, for example, the single winding has an excessive current and the remaining winding currents are within limits so that the average current is less than the overload setting. Known motor controllers that measure imbalance among the winding currents use individual measurements to determine if an imbalance condition exists. However, imbalance is determined by comparing measured currents to a fixed trip level.

The present invention is directed to solving one or more of the problems discussed above, in a novel and simple manner.

SUMMARY OF THE INVENTION

In accordance with the invention there is provided a system and method for monitoring current and providing motor protection.

Broadly, in accordance with one aspect of the invention there is disclosed a motor controller system comprising solid state switches for connection between an AC line and motor terminals for controlling application of AC power to the motor. A user input elements selects a current imbalance parameter. Current sensors sense current in each winding of the motor. A control circuit controls operation of the solid state switches. The control circuit compares the sensed currents with the selected imbalance parameter to determine if a fault condition exists.

It is a feature of the invention that the control circuit compares a ratio of a lowest motor winding current to a highest motor winding current with the selected imbalance parameter to determine if a fault condition exists.

It is another feature of the invention that the control circuit determines a ratio of each motor winding current to each other motor winding current and compares a lowest determined ratio with the selected imbalance parameter to determine if a fault condition exists.

It is still another feature of the invention that the user input device further selects an imbalance disable level and the control circuit ignores a fault if all motor winding currents are lower than the imbalance disable level.

It is still another feature of the invention that the control circuit comprises a programmed processor.

It is yet a further feature of the invention that the current sensors comprise current transformers.

There is disclosed in accordance with another aspect of the invention an elevator starter comprising solid state switches for connection between an AC line and motor terminals for controlling application of AC power to the elevator. Current sensors sense current in each winding of the motor. A control circuit is connected to the current sensors for controlling operation of the solid state switches. The control circuit includes a user input element for selecting a current imbalance parameter and a processing circuit comparing the sensed current with the selected imbalance parameter to determine if a fault condition exists.

There is disclosed in accordance with yet another aspect of the invention a motor controller system comprising solid state switch means for connection between an AC line and motor terminals for controlling application of AC power to the motor. User input means select a current imbalance parameter. Current sensing means sense current in each winding of the motor. Motor control means are operatively connected to the current sensing means for controlling operation of the solid state switches means. The motor control means compare the sensed currents with the selected imbalance parameter to determine if a fault condition exists.

There is disclosed in accordance with yet another aspect of the invention a method of monitoring current and providing motor protection comprising: providing solid state switches for connection between an AC line and motor terminals for controlling application of AC power to the motor; selecting a current imbalance parameter; sensing current in each winding of the motor; controlling operation of the solid state switches; and comparing the sensed currents with the selected imbalance parameter to determine if a fault condition exists.

Further features and advantages of the invention will be readily apparent from the specification and from the drawings.

DETAILED DESCRIPTION OF THE INVENTION

Figure 1:
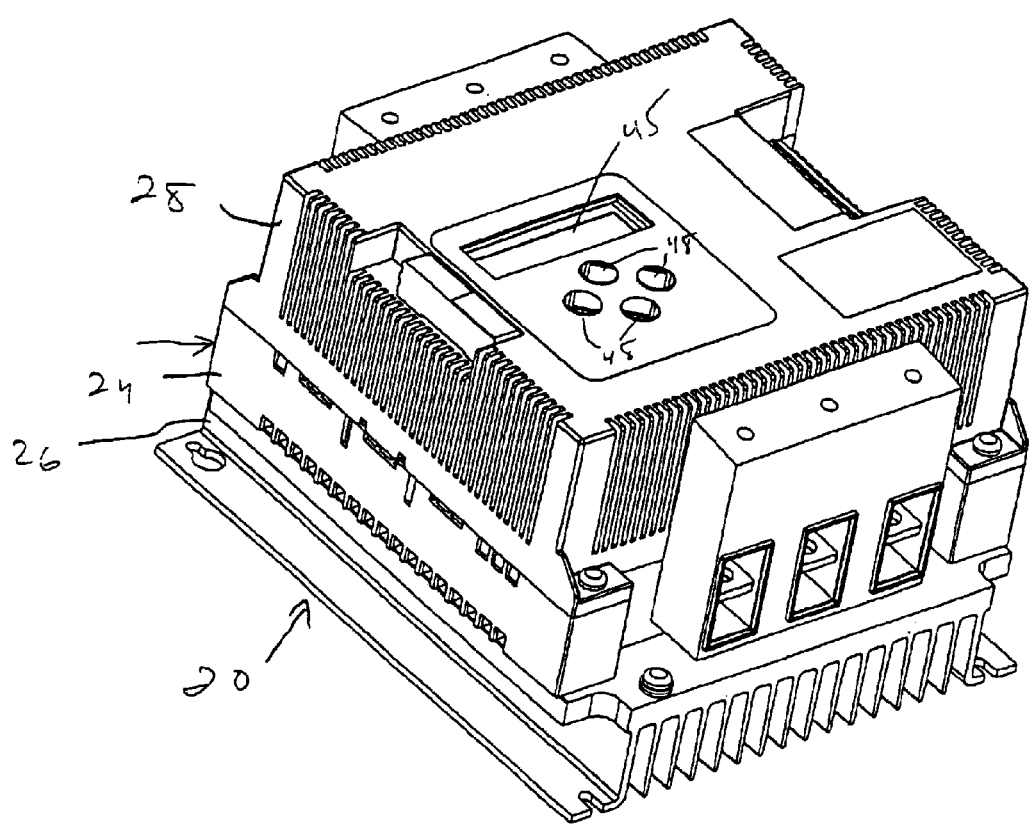
FIG. 1 is a perspective view of a motor controller in accordance with the invention.

Referring initially to FIG. 1, a solid state motor starter/controller 20, referred to hereinafter as simply a starter or a controller, is illustrated. One application for the controller 20 is as an elevator starter. The motor controller 20 may be used to drive a pump for an hydraulic elevator. Each time movement of an elevator car is commanded, then the motor controller 20 must start the elevator motor until it reaches operating speed and then operate in a run mode. Such a motor controller 20 may only be used for the up direction as gravity may be used for the down direction.

The motor controller 20 comprises a housing 22 including a housing base 24, a heat sink 26 and a cover 28. The motor controller 20 includes a plurality of solid state switches 32 in the form of thyristors, such as back to back connected silicon controlled rectifier (SCR) pairs, see FIG. 2. For simplicity herein, the SCR pairs 32 are referred to as simply SCRs. Triacs could also be used. The SCRs 32 control application of three phase AC line voltage to a three phase motor. As is apparent, a different number of SCRs 32 could be used to control different numbers of phases, as is apparent to those skilled in the art.

Figure 2:
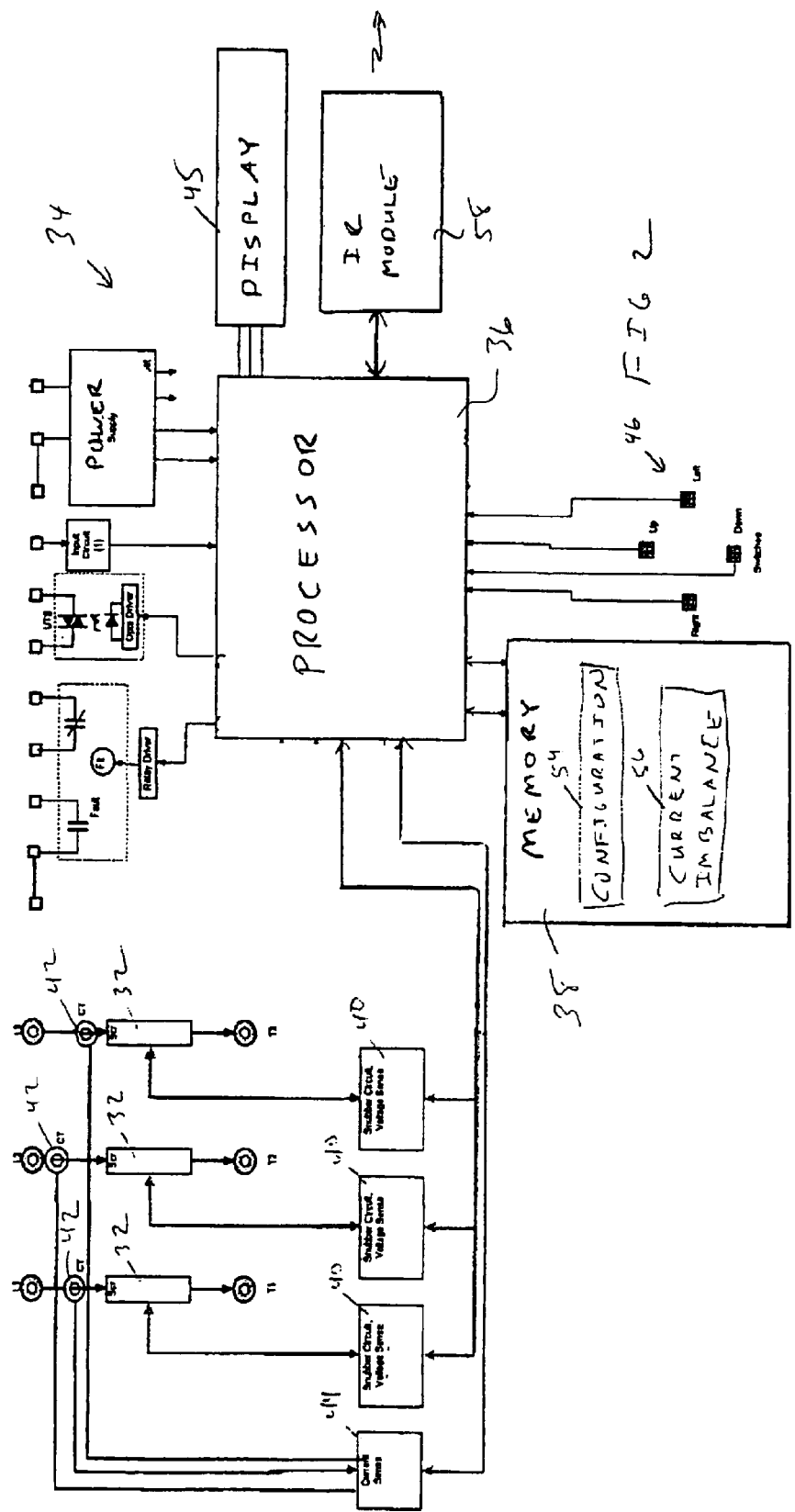
FIG. 2 is a block diagram of the motor controller of FIG. 1.

The SCRs 32 are mounted to the heat sink 26 within the housing 20. Referring also to FIG. 2, a control circuit 34 is also enclosed in the housing 20. The control circuit 34 controls operation of the SCRs 32. Particularly, the control circuit 34 includes a programmed processor 36, such as a digital signal processor, for commanding operation of the SCRs 32. A memory 38 is connected to the processor 36 and stores programs and configuration information relating to operation of the SCRs 32, as described below.

The processor 36 is connected to three interface circuits 40 each for connection to one of the SCRs 32. Particularly, the interface circuits 40 comprise snubber circuits for driving the SCRs 32 and voltage sense circuits for sensing line voltage and motor terminal voltage, representing voltage across the SCRs 32. A current transformer 42 senses current through each of the SCRs 32 and is connected to a current sense circuit 44. Other types of current sensors could be used. The current sense circuit 44 is also connected to the processor 36.

An LCD display 45 on the cover 22, see FIG. 1, is connected to the processor 36. The display 45 is used to indicate configuration settings, operating values, fault conditions, and the like. User actuable switches 46 are electrically connected to the processor 36. The user actuable switches 46 are actuated by actuator elements 48 on the housing cover 22, see FIG. 1. Particularly, the switches 46 are used for locally selecting parameters for stored configuration information.

Figure 3:
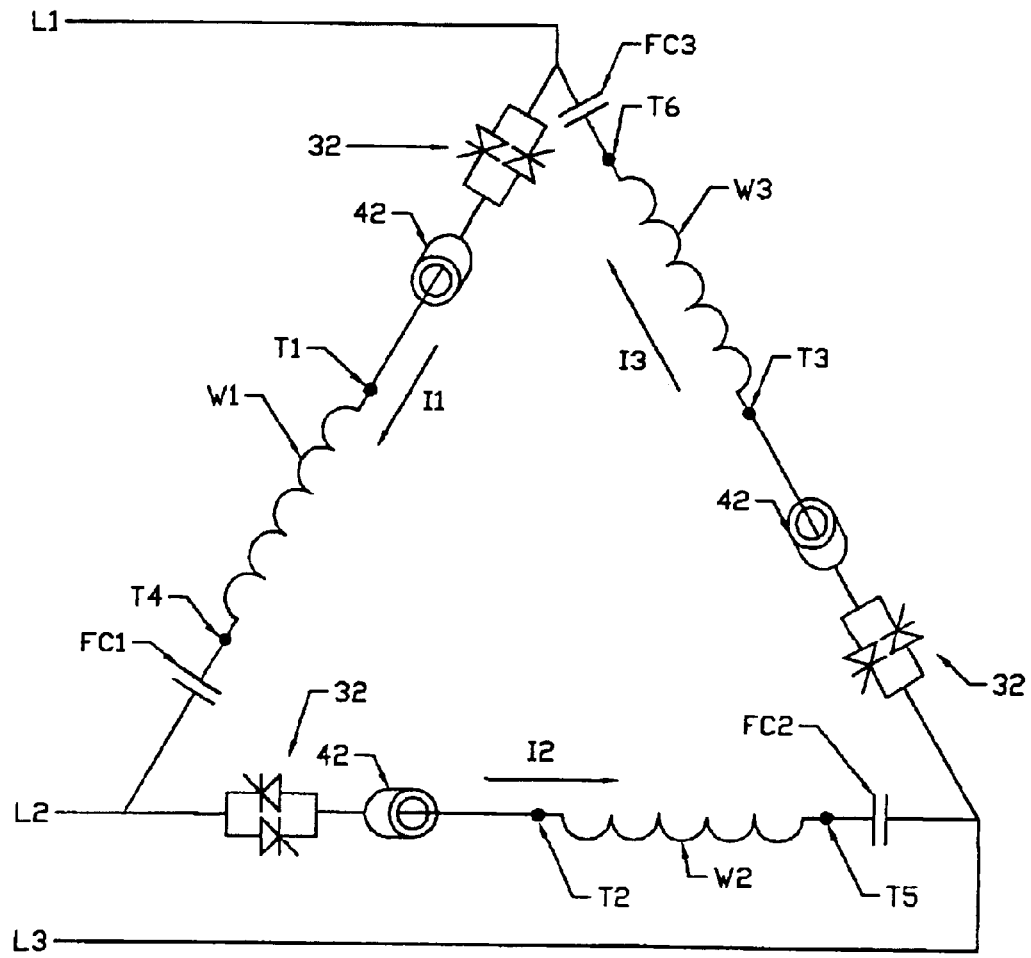
FIG. 3 is a wiring diagram of the motor controller of FIG. 1 connected to a motor in a delta configuration.

Referring to FIG. 3, an electrical schematic illustrates connection of the SCRs 32 of FIG. 2 to motor windings in a delta configuration. For example, one of the SCRs 32 is connected between the first phase line voltage L1 and the first motor terminal T1. The first motor winding W1 is connected in series with the SCR 32 between the motor terminal T1 and another motor terminal T4. The current transformers 42 sense current through the winding W1. A fault contact FC1 is also connected in series. The other legs of the delta configuration are generally similar and are conventional in nature. As is apparent, other motor configurations could be used in connection with the disclosed system and method.

The processor 36 of FIG. 2 operates in accordance with a control program for controlling operation of the SCRs 32. Particularly, each SCR 32 is conventionally controlled to satisfy voltage and current requirements. This is done by altering the firing angle of the SCRs 32. As is conventional, the firing angle is controlled by the processor 36 to satisfy operating requirements. During start mode, the processor 36 ramps the current up by gradually advancing the firing angle in a time specified to satisfy preselect acceleration time and acceleration torque values up to a select starting current limit setting value. By adjusting the delay in firing the SCRs 32, the processor 36 can maintain this level. As the motor speed increases, the current begins to decrease. The processor 36 continually increases the voltage to offset the reduction in current. This maintains a constant current at the setting of the starting current limit switch provided that the voltage to the motor can be increased at a rate greater than the decrease in the motor slip resistance as the motor comes up to speed. Subsequently during a run mode the control circuit 34 applies full voltage to the motor.

In accordance with the invention, the control circuit 34 utilizes a configuration module 54, see FIG. 2, to set configuration parameters and a current imbalance module 56 to monitor motor current and provide motor protection. An imbalance trip level and imbalance disable level are user adjustable using the user actuable switches 46 or a keypad of an external configuration device.

The current transformers 42 sense current through each of the motor windings W1–W3, see FIG. 3. Particularly, the current transformers 42 sense a current I1 through the first winding W1, a current I2 through the second winding W2, and a current I3 through the third winding W3. The configuration module 54 enables a user to adjust a current imbalance trip level from, for example, 0.1 to 0.75. The current imbalance module 56 uses the user selected current imbalance level and determines if a fault condition exists. The determined imbalance level is derived by dividing the RMS value of the current in the winding with the lowest current by the RMS value of the current through winding with the highest current. Particularly, the current imbalance module 56 determines if any of I1/I2 or I2/I3 or I3/I1 or I2/I1 or I3/I2 or I1/I3 is less than the current imbalance trip level. Additionally, the configuration module 54 is used to enable a user to select a current imbalance disable level. This level is used by the current imbalance module 56 to control the level at which the current imbalance fault is disabled. The current imbalance fault is disabled when the three sensed currents are all less than the product of the imbalance disable level and the delta equivalent of the current overload setting.

Figure 4:
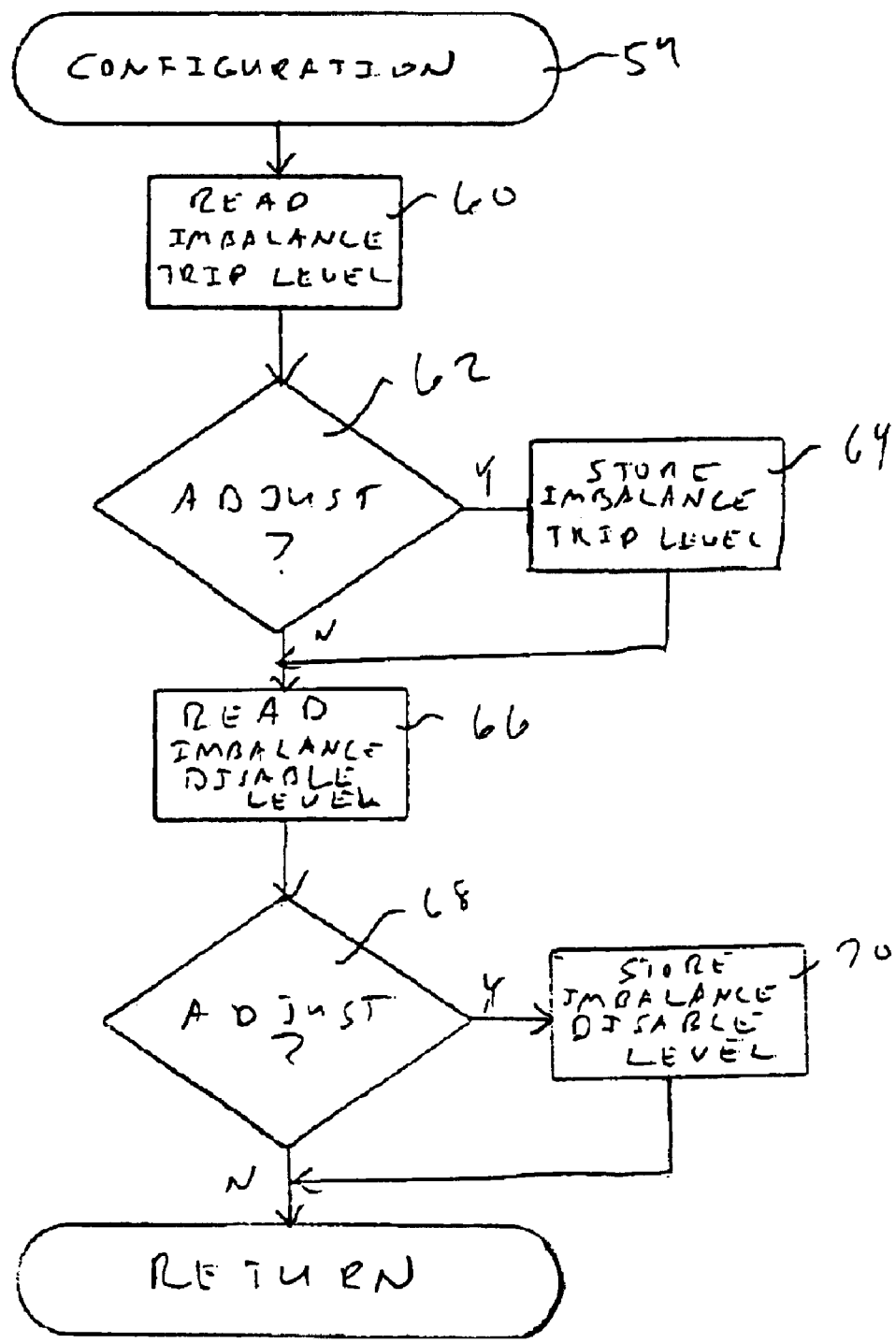
FIG. 4 is a flow diagram illustrating a configuration module implemented by a processor of FIG. 2.

Referring to FIG. 4, a flow diagram illustrates a program for the configuration module 54 for enabling a user to select a current imbalance parameter and imbalance disable level. The user selection is made using the user actuable switches 46 and the LCD display 45. Alternatively, the parameters could be received from an external device via a wireless IR module 58 also connected to the processor, or via some other hard wired configuration device.

The configuration module begins at a block 60 which reads the stored imbalance trip level from the memory 38. A decision block 62 determines if any adjustment is made as by a user operating the switches 46, or other input device. If so, then the updated imbalance trip level is stored in the memory 38 at a block 64. Thereafter, or if no adjustment is called for, a block 66 reads a stored imbalance disable level from the memory 38. A decision block 68 determines if any adjustment is to be made. If so, then the updated imbalance disable level is stored at a block 70 in the memory 38. Thereafter, or if no adjustment is to be made, then control returns to the main program.

Figure 5:
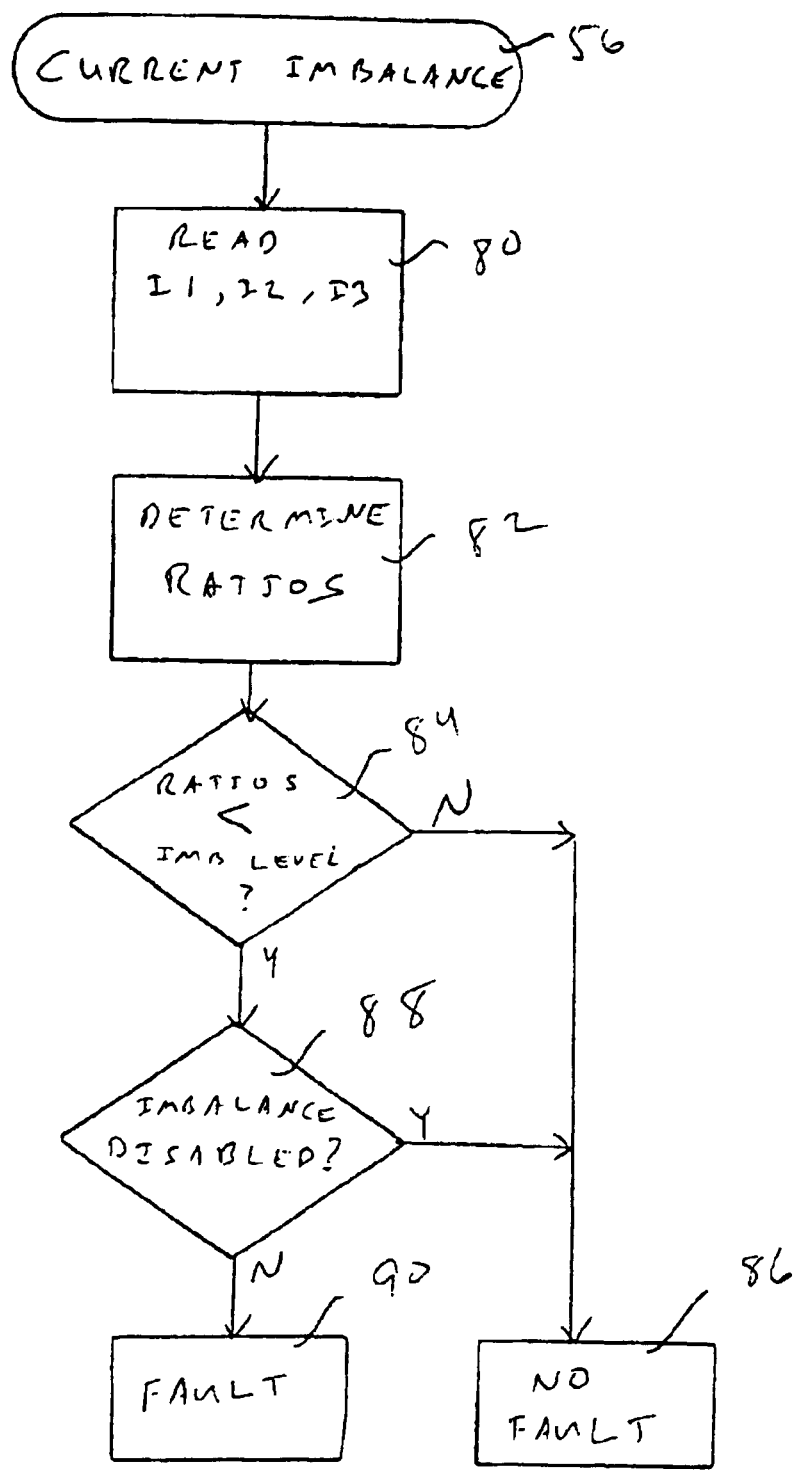
FIG. 5 is a flow diagram illustrating a current imbalance module implemented by the processor of FIG. 2.

Referring to FIG. 5, a flow diagram illustrates a program for the current imbalance module 56. The current imbalance module begins at a block 80 which reads the three current values I1, I2 and I3 from the current transformers 42. A block 82 determines the ratios of each sensed winding current to each of the other sensed winding currents, as discussed above. A decision block 84 determines if any of the ratios is less than the stored imbalance level. As such, the decision block 84 compares a ratio of a lowest motor winding current to a highest motor winding current with the imbalance level. If not, then no fault exists and control proceeds to a block 86 and then returns to the main program. If at least one of the ratios is less than the imbalance level, then a decision block 86 determines if current imbalance is to be disabled. This decision block determines if the sensed currents I1–I3 are all less than the product of the stored imbalance disable level and the delta equivalent of the overload setting stored in memory 38. If imbalance is disabled, then no fault exists and control proceeds to the block 86. If an imbalance is not disabled, then the control proceeds to a block 90 indicating a fault condition. This results in a trip level which is supplied to a main fault routine of the control circuit 34 to take corrective action such as turning the motor off, slowing the motor down, as necessary or desired.

Thus, in accordance with the invention, the control circuit 34 monitors individual currents and determines imbalance among current windings for indicating a fault condition.

It can therefore be appreciated that a new and novel system and method for monitoring current and providing motor protection in a motor controller has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

We claim:

1. A motor controller system comprising:

solid state switches for connection between an AC line and motor terminals for controlling application of AC power to the motor;

a user input element for selecting a current imbalance parameter;

current sensors for sensing current in each winding of the motor; and a control circuit for controlling operation of the solid state switches, the control circuit comparing the sensed currents with the selected imbalance parameter to determine if a fault condition exists.

2. The motor controller system of claim 1 wherein the control circuit compares a ratio of a lowest motor winding current to a highest motor winding current with the selected imbalance parameter to determine if a fault condition exists.

3. The motor controller system of claim 1 wherein the control circuit determines a ratio of each motor winding current to each other motor winding current and compares a lowest determined ratio with the selected imbalance parameter to determine if a fault condition exists.

4. The motor controller system of claim 1 wherein the user input device further selects an imbalance disable level and the control circuit ignores a fault condition if all motor winding currents are lower than the imbalance disable level.

5. The motor controller system of claim 1 wherein the control circuit comprises a programmed processor.

6. The motor controller system of claim 1 wherein the current sensors comprise current transformers.

7. A motor controller system comprising:

solid state switch means for connection between an AC line and motor terminals for controlling application of AC power to the motor;

user input means for selecting a current imbalance parameter;

current sensing means for sensing current in each winding of the motor; and motor control means operatively connected to the current sensing means for controlling operation of the solid state switch means, the motor control means comparing the sensed currents with the selected imbalance parameter to determine if a fault condition exists.

8. The motor controller system of claim 7 wherein the motor control means compares a ratio of a lowest motor winding current to a highest motor winding current with the selected imbalance parameter to determine if a fault condition exists.

9. The motor controller system of claim 7 wherein the motor control means determines a ratio of each motor winding current to each other motor winding current and compares a lowest determined ratio with the selected imbalance parameter to determine if a fault condition exists.

10. The motor controller system of claim 7 wherein the user input means further selects an imbalance disable level and the motor control means ignores a fault condition if all motor winding currents are lower than the imbalance disable level.

11. The motor controller system of claim 7 wherein the motor control means comprises a programmed processor.

12. The motor controller system of claim 7 wherein the current sensing means comprise current transformers.

* * * * *